Feb. 1, 1966   W. R. SCHACK ETAL   3,232,770
METHOD OF STERILIZING AND CANNING FOOD MATERIAL
Filed Feb. 15, 1965   3 Sheets-Sheet 1

Inventors
Warren R. Schack
Wayne E. Livingston
By R.J. Story
Attorney

Feb. 1, 1966  W. R. SCHACK ETAL  3,232,770
METHOD OF STERILIZING AND CANNING FOOD MATERIAL
Filed Feb. 15, 1965  3 Sheets-Sheet 3

Inventors
Warren R. Schack
Wayne E. Livingston

By R. G. Story
Attorney 3,232,770
METHOD OF STERILIZING AND CANNING FOOD MATERIAL
Warren R. Schack, Western Springs, and Wayne E. Livingston, Park Forest, Ill., assignors to Swift & Company, Chicago, Ill., a corporation of Illinois
Filed Feb. 15, 1965, Ser. No. 436,416
8 Claims. (Cl. 99—182)

This is a continuation-in-part of our copending application No. 78,628, filed December 27, 1960, now abandoned.

This invention relates to the sterilizing and canning of food products, and more particularly concerns an improvement in sterilizing and canning foods at superatmospheric pressure. It is to be understood that by canning we refer to packing of food in rigid sealed containers, usually metal or glass, under conditions which permit the packaged item to be indefinitely shelf-stable at normal room temperatures.

Generally, canned food products have exhibited characteristic unnatural flavors to the consumer. With the advent of improved transportation and distribution of fresh foods, and the widespread use of other preservation techniques, such as freezing, the unnatural flavors of canned products have become, by comparison, more noticeable to the consuming public. In some instances this factor is thought to have contributed to consumer rejection of otherwise wholesome and stable canned items.

The unnatural flavors are encountered in both meat and vegetable products. Certain of the unnatural flavors result from the food preparation method and are identified as "cooked in the can" or "boiled" flavors. It is our belief that they are promoted by at least two conditions heretofore encountered in canning operations, namely, overcooking, and cooking in a sealed container in the presence of relatively large portions of liquid diluting material which is normally canned with the food product. These unnatural flavors are not to be confused with a metallic taste sometimes imparted to food packed in metal cans, the latter being a characteristic of the container rather than the food preparation.

In the usual canning process the cans are filled with product formula, including liquid constituents or fillers, sealed, and retorted in large batches. Retorting, while primarily intended to sterilize the product, also cooks it within the sealed can. It cannot be said that all bacteria and spoilage organisms are destroyed during retorting, but commercially acceptable and nutritionally safe sterilization levels may be obtained by holding the product at elevated temperatures for periods of time inversely proportionate to the temperature. That is, generally at higher temperatures shorter periods of time are lethal for a sufficient percentage of bacteria to effect sterilization. Suitable time and temperature requirements may be defined by $F_0$ values which are basically time equivalents at 250° F. Reference is directed to the National Canners Association "Laboratory Manual for the Canning Industry," 2nd Edition, 1956, for further information on this matter.

Temperatures must be held within practical limits to avoid excessive thermal damage to the product and to avoid excessive stresses upon the cans. Unfortunately, in the retorting process the time and temperature conditions necessary to effect sterilization also result in overtreatment of at least portions of the food product. In this regard it must be noted that heat transfer within the sealed can will result in the outer portions or product reaching relatively high temperatures for longer periods as contrasted with the central portions. Consequently, impairment of the organo-leptic qualities occurs.

Additionally the heating of a product in the presence of large amounts of liquid, usually water, also appears to impair flavor or taste values of the product probably due to a loss of flavor material to the liquid. This effect is similar to cooking in excess water or boiling often employed by the homemaker with tough or poor quality foods. Furthermore, when food products are cooked in a closed container or vessel, any undesirable volatile materials which would normally escape in home cooking will be retained within the product, probably in the diluting agent.

The conventional retorting process, in addition to impairing certain flavor values, is also time-consuming since it requires large batches of canned product to be placed in a retort vessel, which is then raised to a superatmospheric pressure and elevated temperature for a time sufficient for all of the product within each can to reach and hold a given temperature until sterilized. Further, the cans must be cooled and the pressure within the retort reduced before the latter may be opened and the cans removed.

In an attempt to overcome the disadvantage of retorting the canning industry has directed much interest to processes for at least partially sterilizing food product at high temperature and pressure before can filling. One such process is taught in the Smith, Ball Patent No. 2,541,113, the disclosure of which is included herein by reference. That process comprises heating of complete product formula to temperatures as high as 280° F., while under superatmospheric pressure, to effect partial sterilization; then filling into partially presterilized cans at a reduced but still superatmospheric pressure; and finally completing the sterilizing of both can and contents and subsequently cooling the canned item.

While this process may largely overcome certain disadvantages of retorting, such as time and labor requirements, it involves entirely different equipment requiring substantial capital expenditure. To date, it has not been widely accepted in the industry. Accordingly the present invention is an improvement over the process and system disclosed in the Smith, Ball Patent No. 2,541,113.

It is our stated belief that the unnatural flavors associated with prior art canning methods is due to heating the food product in the presence of all the liquid requisite in the formula, and overcooking at least portions of the material when adding sterilizing heat to the canned item. Additionally in a process such as that of the Smith, Ball patent, damage may be inflicted by flashing the product through a wide temperature range of 20° F. or more directly from sterilizing temperatures to much lower filling temperatures. The latter damage occurs when the boiling point of the product drops below the actual product temperature (when pressures are instantaneously decreased without first lowering temperatures substantially) resulting in internal explosion of steam from beneath the surface of food material.

Therefore, it is a principal object of this invention to provide an improved system for continuously sterilizing and subsequently filling food product into containers at high temperature and superatmospheric pressures.

An additional object of this invention is to provide an improved method for continuously sterilizing and subsequently canning food product at high temperature and superatmospheric pressures employing conditions calculated to avoid development of unnatural flavors.

A further object of this invention is to provide an improved method for sterilizing and subsequently canning food products at high temperatures and superatmospheric pressures wherein at least a substantial portion of the sterilizing is accomplished with less liquid than required in the final product formula.

Still another object of this invention is to provide a method for sterilizing and subsequently canning food product at elevated temperatures and pressures wherein flashing of the product during reduction of temperature and pressure is carefully controlled to prevent physical damage and improve organoleptic quality.

We have found that most objectionable unnatural flavors can be reduced by subjecting only a portion of the food product formula, containing less than the requisite amount of liquid, to maximum temperatures, under pressure, for a time at least sufficient to substantially sterilize that portion; and only then adding enough liquid to complete the formula at a temperature which will maintain the mixture at a sterilizing level.

We have also found that objectionable unnatural flavors can also be reduced by subjecting a complete food product formula, to controlled deaeration through rapid pressure reduction limited to induce a temperature drop of up to about 20° F., and entirely at pressures above atmospheric.

We have further found that objectionable unnatural flavors not eliminated heretofore by high pressure sterilizing processes may, to a high degree, be prevented by treating pumpable components of the product formula at temperatures and pressures in excess of can sealing conditions, while nonpumpables are treated separately at elevated temperatures and pressures substantially at the latter conditions. Such treatment of the pumpables is carried out as the material flows through conduits carefully maintained at pressures which hold the boiling point above resident temperatures, gradually decreasing in the direction of flow to the can sealing conditions.

Accordingly our invention contemplates a pressure sterilizing and canning process incorporating any of the foregoing steps wherein the food product formula is first sterilized, flash-deaeration at controlled conditions, and diluted prior to being injected into a can, and where such sterilized product contains sufficient residual heat to also sterilize the interior surfaces of each container. In this regard we have found that the food material generally requires a greater level of sterilization (a higher $F_0$ value) for confidence in acquiring nutritionally safe and shelf stable characteristics than required for a clean container. That is, the food material usually harbors greater numbers of bacteria and spoilage organisms than the container surface, and consequently is preferably heated to a higher temperature or held longer at sterilizing temperatures, or both. Furthermore, it is usually required that the food material be at least partially cooked during the sterilizing operation; and at the high temperatures herein contemplated, sterilization takes place far more rapidly than cooking. Accordingly the cumulative periods for food and container sterilization may be relied upon, and increased where necessary, to accomplish the necessary degree of cooking.

The system for carrying out our process basically comprises a chamber capable of containing pressures above atmospheric wherein can filling and sealing is effected, and a conduit extending therein for delivering product formula from sterilizing apparatus. The sterilizing apparatus includes a formula supply means, a pressurized means for adding sterilizing heat to formula received from the supply means, means for adding fluid to the formula after the sterilizing heat has been added, and a plurality of controllable pressure means connected serially with the aforementioned elements and chamber.

A more complete understanding of our invention will be apparent from the following description taken in conjunction with the drawings wherein.

*The preferred sterilizing system*

Figure 1:
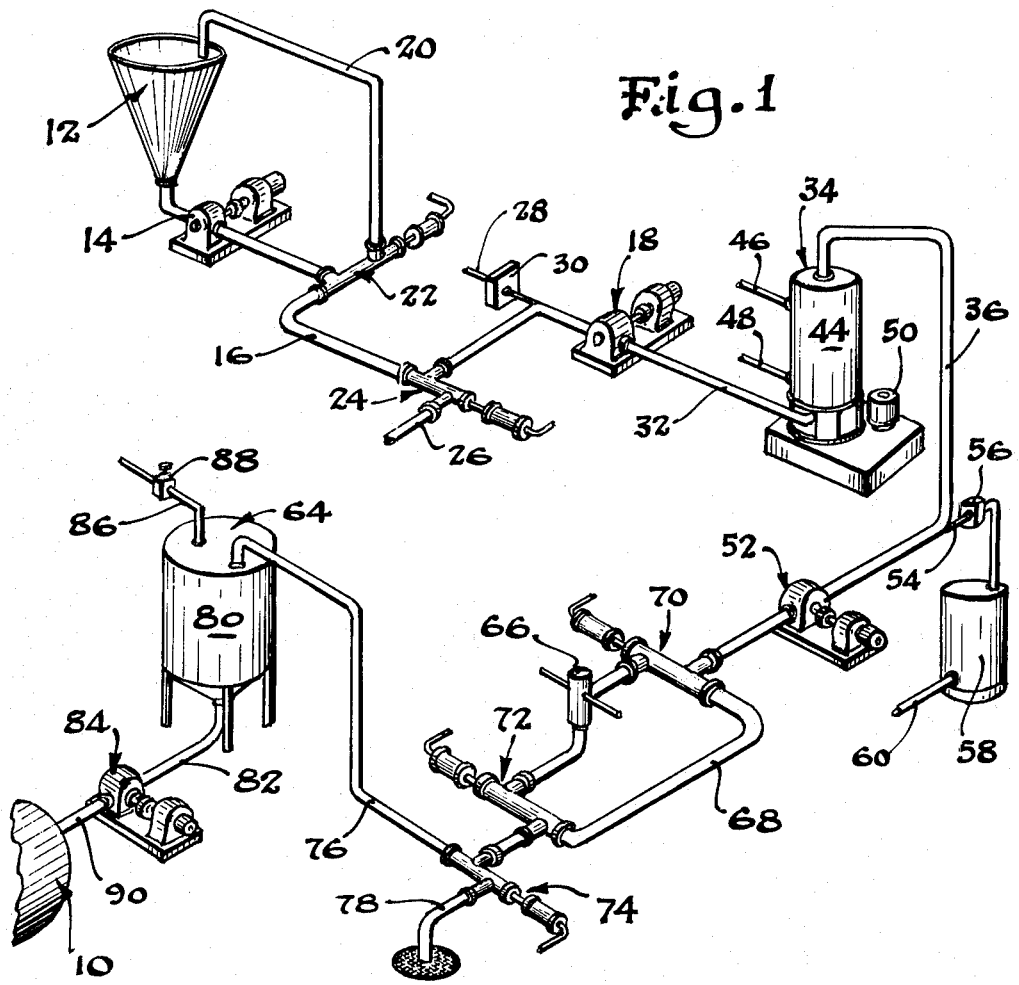
FIGURE 1 is a diagrammatic view of the preferred sterilizing apparatus of the present system.

Preferably, all of the foregoing improvements are incorporated in the present system, as illustrated in FIGURE 1. Referring to that figure, the sterilizing system is seen to comprise heating, dilution, and deaerating means serially connected by sanitary conduit to the interior of a pressurized can filling and sealing chamber generally 10 which is shown in detail in FIGURE 3. Formula components to be sterilized at high temperature and pressure are delivered to a supply means, such as hopper 12, from which they are pumped into the system by a controllable pressure means, namely, feed pump 14.

The various pressure means are pumps (including pump 14) located throughout the system, that are speed controllable by means of variable speed transmissions to impart desired pressures in the conduits. The desired pressures will be dependent upon the operating conditions, principally temperatures, employed for specific products. Generally the pumps are regulated to develop pressures at or exceeding the vapor pressure of the liquid phase, usually water, of the formula at each zone of the system. This can be accomplished by running an upstream pump at a slightly faster rate than the next downstream pump, which then acts as a back pressure pump, or by introducing additional material between pumps.

From pump 14, material is forced through a conduit generally 16 to a second feed pump 18. However, a return conduit 20 is connected to the conduit 16, through a return valve unit generally 22 near the discharge side of pump 14, for diverting material to the hopper 12 when the system is shut down. Also between pumps 14 and 18 another valve unit generally 24 is provided to connect the conduit 16 with a source of hot wash water through pipe 26, for flushing and cleaning the entire system at the close of an operating run and/or preparatory to a new run.

The preferred embodiment of our invention includes two means for adding heat to the material. In advance of the inlet side of the second feed pump 18, a steam line 28 is attached to the conduit 16 through a steam flow control valve 30 from a super-heated steam source, not shown. Steam introduced to the system through flow control valve 30 is primarily utilized for preheating the material to be sterilized by direct injection and admixture therewith. It also provides a portion of the dilution requirements of the formula. However, it will be appreciated that steam injection under certain conditions may provide the entire sterilization requirements and even all dilution water necessary to the formula.

A conduit 32 extends from the discharge side of pump 18 to a suitable heat exchanger generally 34, normally supplying sufficient heat for sterilizing the food material. The material then passes into a holding conduit 36 wherein sterilization is achieved. Any suitable heat exchanger operable at high pressure may be utilized in this system. However, we prefer to use a cylindrical scraped wall heat exchanger, such as a Votator. The Votator shown in FIGURE 1 comprises a steam jacketed vessel 44 having steam connections 46, 48 and an internal agitator or mutator, not shown, powered by an electric motor 50. The mutator is fitted with blades which continuously scrape the interior surface of the heat exchanger and maintain rapid transfer of heat to the product without burning.

In practice where a heat exchanger such as the Votator 34 is utilized, feed pump 18 preferably is regulated to impart a pressure on the material within the Votator about 15 p.s.i.g. above the steam pressure supplied to the vessel 44 through connection 46. This precaution is advisable not only to avoid the possibility of thermally damaging food material coming into direct contact with the interior surfaces of the heated vessel, but also to avoid flashing in the Votator which would disrupt pumping rates. Additionally, this margin of pressure is usually sufficient to maintain the pressure on the food material passing through holding conduit 36 above the liquid phase vapor pressure at the temperatures encountered therein. The various temperature-pressure relationships for steam and for products containing water the liquid phase may readily be determined from standard steam tables, such as those found in Perry, J. H., "Chemical Engineer's Handbook" 3rd Edition (1950) published by McGraw-Hill Book Co., Inc., included herein by reference.

With regard to the steam requirements for this system, any suitable source of clean, dry steam sufficient to supply the requisite rate, temperatures, and pressure may be employed. We have calculated that a system for producing about 5,000,000 pounds of product annually would require a steam source capable of supplying about 110,000 pounds per hour at 160–200 p.s.i.g. The main steam supply would be reduced to appropriate pressures and rates at various locations in the system through valves, etc. Usual control valves operate at about two-thirds capacity, i.e., the available pressure and rate on the high pressure side of a control valve should be about 50% more than the low pressure requirements.

The holding conduit 36 must be of sufficient dimensions to provide a transit time sufficient to effect sterilization of food material flowing therethrough at about the temperature reached in the heat exchanger 34. Preferably the sterilization level should be sufficient for shelf stability of the product and the time will generally not exceed 4–5 minutes. Conduit 36 may be insulated to preserve the temperature of the material leaving the heat exchanger 34; however, only a 2–5° F. temperature loss has been experienced when left uninsulated.

Holding conduit 36 extends to a back pressure pump 52 operable to maintain, in cooperation with feed pump 18, a superatmospheric pressure in the system therebetween. However, preceding pump 52, means is provided for adding fluid to the material, such as by injecting a constant flow of dilution liquid through an injection nozzle 54 connected to the holding conduit 36. In turn injection nozzle 54 is supplied through a flow regulator valve 56 from a pressurized liquid heater generally 58 which is connected to a source of liquid supply, not shown, by pipe 60. The heater 58 should be capable of supplying the formula dilution requirements under superheated conditions as high as about 270° F. in liquid state. According to specific operating conditions the dilution liquid at its source may be sterile, or partially sterile so long as the temperature of the diluted material is sufficiently high in temperature to maintain sterilization during the remaining period of the canning process. A sanitary city water supply is normally the liquid source.

Downstream from the back pressure pump 52, diluted formula is directed through one of two parallel alternate paths to a flash deaerator generally 64. As illustrated in FIGURE 1, a back pressure valve 66 and a by-pass line 68 are connected in parallel between two valve units generally 70 and 72. Another valve unit generally 74 is connected between valve 72 and a conduit 76 leading to the deaerator generally 64. Processed material normally flows from pump 52 through the bypass line 68 into conduit 76 and deaerator 64; and valves 70 and 72 are positioned accordingly. However, due to the high operating temperatures in the system, all of the pumping equipment is manufactured with high temperature clearances and thus will not maintain pressures on water alone, or on a thin, watery product formula. (Water is normally forced through the system at commencement of operation while bringing the equipment to operating conditions.) Accordingly valves 70 and 72 are operated to place the back pressure valve 66 (comprising a restricted orifice) on stream for thin, watery materials. Furthermore, where such a product is being processed, pump 52 may be allowed to idle, since the back pressure valve 66 will adequately maintain pressures upstream to pump 18.

A divert conduit 78 is connected to the valve unit generally 74 for purposes of selectively flushing the system upstream thereof, or for dumping product before it reaches the deaerator 64. Normally, however, valve 74 is positioned to direct flow from either bypass line 68 or back pressure valve 66 to the deaerator.

The deaerator 64 comprises a relatively large volume vessel 80 having a product discharge conduit 82, extending from the bottom thereof to a discharge pump 84, and a vapor exhaust line 86, extending from the top of the vessel through a pressure control valve 88. The pressure control valve 88 is automatically controlled, according to the system operating conditions, to discharge steam and volatiles flashed from product entering the deaerator; and to limit the pressure differential within the vessel 80 to above atmospheric levels which induce a temperature drop of no more than about 20° F. in the product between conduits 76 and 82. Temperature of the product exiting from the deaerator should be approximately the can filling temperature, preferably between 250° F. and 270° F. For this range the pressure within the deaerator generally 64 should be from about 15 p.s.i.g. for the lower temperature to about 27 p.s.i.g. for the higher filling temperature. Pressure control valve 88 is adjusted accordingly. Discharge pump 84 functions to maintain a positive superatmospheric pressure level at the discharge of the deaerator 64 and to propel the product formula through a delivery conduit 90 into the pressure chamber generally 10.

Figure 2:
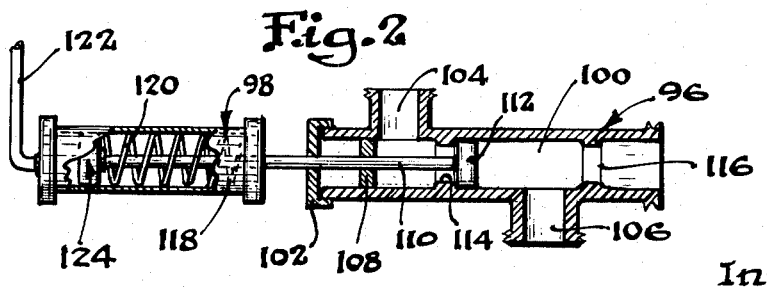
FIGURE 2 is a sectional plan view of a valve unit used in the system.

Structure of the valve units generally 22, 24, 70, 72 and 74 is shown in FIGURE 2. Each valve comprises a conduit section generally 96 and an actuator section generally 98, the latter preferably being pneumatically operated. However, other actuator apparatus, such as hydraulic or solenoid devices, are suitable. The conduit section consists of a main passageway 100 closed by a cap 102 at one end and open at the other end. Two laterally extending passageways 104, 106 are spaced along the main passageway 100. Each passageway 100, 104, and 106 is adapted to be joined to conduits in the described system. A plug 108 preferably blocks the passageway 100 between lateral passageway 104 and the cap 102. Both the plug 108 and cap 102 have central openings adapted to slidably receive a piston rod 110 extending from the actuator section 98 to a piston 112 within the main passageway 100. Suitable packing may be provided at the plug 108 and cap 102 to prevent leakage from the high pressure system.

A pair of annular piston seats 114 and 116 located in the main passageway between passageway 104 and 106, and between passageway 106 and the open end of passageway 100, respectively, cooperate with the piston 112 to block off one opening of the passageways and direct flow through the other two. The actuator section 98 contains a piston 124 attached to rod 110 which is biased toward one end of a cylinder 118 by a compression spring 120. A high pressure air line 122 is connected to the latter end of cylinder 118 whereby, by controlling induction and exhaust of air to the cylinder, the piston 112 may be moved between the two positions. Preferably each such valve unit is positioned in the piping system so that during normal operation conditions, flow is directed between passageway 106 and the open end of passageway 100, in either direction, so as not to be impeded by rod 110.

*The pressurized filling chamber*

Figure 3:
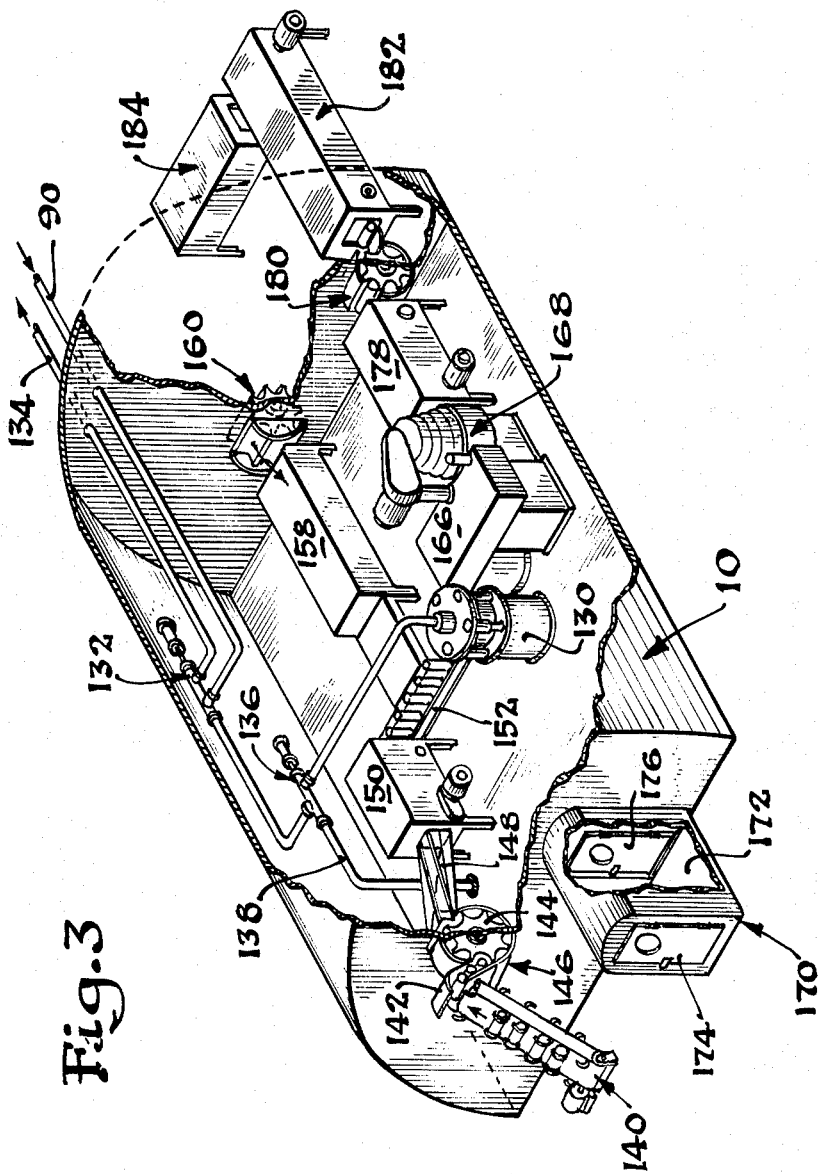
FIGURE 3 is a perspective view showing the interior of the pressurized can filling and sealing chamber of the present system.

The chamber generally 10 illustrated in FIGURE 3, is preferably large enough to accommodate standard can filling and sealing equipment and a crew of operating personnel to service the equipment and correct any malfunction thereof. Additionally the chamber 10 houses auxiliary cooking apparatus to be utilized for components of canned product such as meat patties, steaks, etc., which cannot be pumped through the above-described system.

Specifically referring to FIGURE 3, it may be seen that the delivery conduit 90 enters through one wall of the chamber 10 and extends overhead to a can-filling machine generally 130. A valve unit 132 within the chamber 10 connects the delivery conduit 90 with a return conduit 134 to hopper 12 or some other suitable collecting vessel in case the filling machine 130 is shut down and the product must be diverted for re-use. Additionally, another valve unit 136, in delivery conduit 90, is connected to a drainpipe 138 for dumping the system to a sewer. The latter is generally used when the system is being flushed following a run of product or just preceding a new run.

Also in FIGURE 3 may be seen a can delivery conveyor generally 140 and a can inlet valve generally 142 for passing empty cans from the outside to the inside of the chamber 10. Inlet valve 142 is in the form of a rotatable star wheel 144 positioned in an airlock generally 146 at one end of the chamber whereby the cans may be delivered without loss of pressure from the chamber 10. As illustrated, cans are received sidewise into the chamber and slide down guideway 148 which turns them 90° before entering a can cleaner generally 150. The latter apparatus merely rinses the cans, preferably with water at about 180° F. to remove dirt or other foreign matter in conformance with Federal Government (USDA–MID) standards, but does not sterilize them. An air cleaner is also commercially available in lieu of a hot water can cleaner. The cans are then delivered by an endless conveyor 152 to the can filling machine 130, wherein they are filled with the proper amount of hot sterilized product from delivery conduit 90.

The endless conveyor 152 carries the cans adjacent to one end of a food preparation table generally 158 to the filling machine 130. The table 158 extends toward another wall of the chamber 10 wherein a product inlet valve generally 160, similar in construction to can inlet valve 142, is located. Table 158 is employed for the preparation of non-pumpable components of food products to be canned. As will be later made clear, these items, such as steaks, may be brought into the chamber through inlet valve 160 and cooked in suitable apparatus such as hot fat cookers or infrared heating equipment, not shown, on the preparation table 158, from which suitable portions are placed within each passing can on conveyor 152 by an operator or suitable automatic equipment.

After filling, the unsealed cans enter a lid-applying mechanism generally 166 from whence they pass into a standard closing machine generally 168. A supply of lids may be carried into the chamber 10 through a personnel airlock shown generally at 170. Airlock 170 comprises a small antechamber 172 having an outer port 174 and an inner port 176, the latter leading into the chamber 10. Personnel and material entering through the airlock 170 are held in the antechamber 172, with both ports 174, 176 closed, while being relatively slowly brought up to the pressure within chamber 10, the latter usually averaging approximately 15–17 p.s.i.g.

Sealed cans, after passing through the closing machine 168, are run through a can washer generally 178, which is operated substantially at the can temperature, to remove any spilled food material from the outside thereof. The cans are thence discharged from the chamber through an exit valve generally 180 substantially the same in construction as the can inlet valve 142. Outside the chamber 10 and at atmospheric pressure the cans discharged from exit valve 180 proceed immediately through a high temperature holding tunnel generally 182 which is regulated to maintain the exit temperature of can and contents for a period of time calculated to insure sterilization of the internal surfaces of the cans. Dependent on the canning temperature, this period does not usually exceed about ten minutes, and usually one to five minutes is sufficient where the holding tunnel employs hot air at an ambient temperature of 250° F. to 270° F. to maintain can temperature. Product leaving the holding tunnel 182 is immediately cooled in chamber 184 by flushing with cold water. This is followed by the normal labeling and casing steps common to canning operations. However for other than small size cans it is advisable to locate the holding tunnel and some partial cooling equipment within the pressurized chamber, for processing in accordance with the same time and temperature conditions, so that differential pressures on interior and exterior large can surfaces will not cause damage to the can.

*Modified sterilizing systems*

Figure 4:
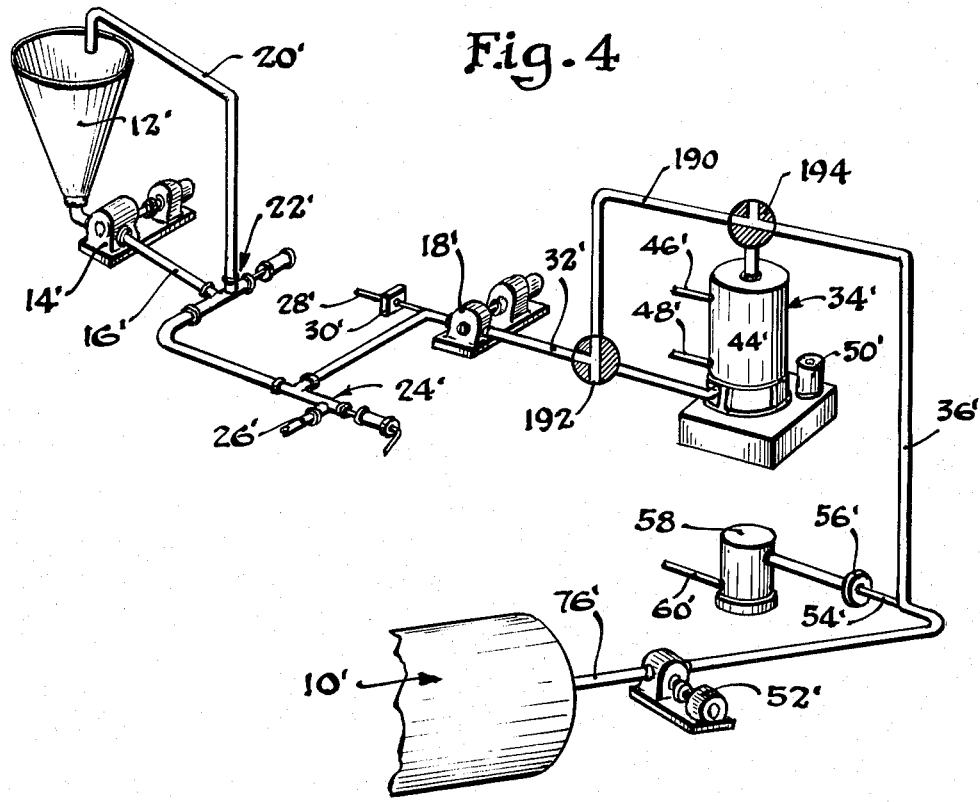
FIGURES 4 and 5 are diagrammatic views of modifications of the apparatus of FIGURE 1.
Figure 5:
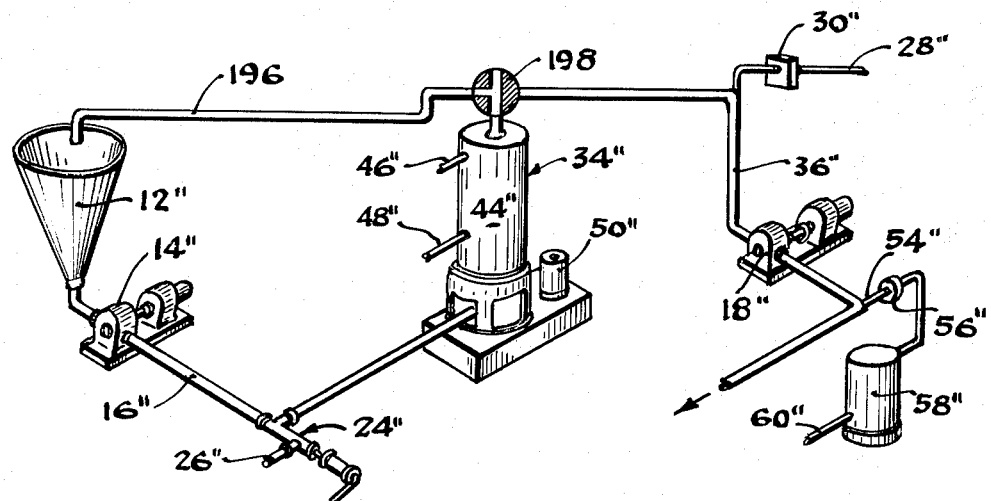

FIGURES 4 and 5 illustrate modified embodiments of the sterilizing system of FIGURE 1. Elements common to FIGURE 1 and to either FIGURE 4 or 5 bear the same reference characters with prime and double prime exponents, respectively.

In FIGURE 4 a system omitting deaerating equipment is illustrated. Also a by-pass conduit 190, around the heat exchanger generally 34′ and between conduits 32′ and 36′, is shown. The bypass conduit 190 is connected to conduits 32′ and 36′ by means of a pair of three-way valves 192 and 194, respectively, so that an operator may elect to process material without the heat exchanger under certain conditions.

Generally the heat exchanger 34′ may be avoided where sufficient steam may be injected through control valve 30′ to raise the material to satisfactory sterilizing temperatures, without adding an excess of water to the final product. (Under the same conditions the heat exchanger 34 of the system in FIGURE 1 could also be bypassed.)

Furthermore the deaerating equipment may be omitted (as in FIGURE 4) where the system is to operate at sterilizing temperatures which can readily be lowered to canning level solely by the addition of dilution water. In this instance the conduit 76′ leads directly from back pressure pump 52′ to the pressure chamber, generally 10′.

In FIGURE 5 another system is illustrated wherein steam injection through control valve 30″ is provided downstream of the heat exchanger generally 34″, in holding conduit 36″, rather than upstream thereof. Also, in this embodiment a return conduit 196 to hopper 12″ is connected to the discharge end of the heat exchanger 34″, at holding conduit 36″, by a three-way valve 198. Following the point of addition of dilution water at nozzle 54″, the modified embodiment may provide for deaeration equipment per FIGURE 1 or a direct connection to the pressure chamber equipment per FIGURE 4 under the same conditions imposed upon those embodiments.

*The process*

The manipulative procedures of our invention will have become clear from the preceding description. However, the operating details are dependent upon the sterilizing temperature selected which may range broadly from about 225° F. to about 400° F. in this system. Preferably, sterilizing temperatures between 250° and 300° F. are employed. It has been stated that pressures throughout the various zones of the system must be maintained above the vapor pressure of the liquid components of the food product formula at the resident temperatures. This is to prevent boiling or flashing of the material uncontrollably during the process. Accordingly, pressures at the sterilizing temperature, in the heat exchanger generally 34, should be in the range of 30 to 160 p.s.i.g.

In carrying out this method the more or less solid components of the product formula are prepared with substantially less water than the final product requires. These undiluted components must contain sufficient liquid to be pumpable and usually constitute from 75% to 80% of the final mixture. Preparation of these materials may entail partial precooking. They are introduced to the system through hopper 12 and pumped at from 10 to 120 p.s.i.g. toward the heat exchanger.

Steam at above about 60 p.s.i.g. is injected into the undiluted components in quantities sufficient to preheat the mixture to above about 200° F. to 250° F. In some instances it is possible to provide the entire sterilizing heat requirements by injecting steam directly into the undiluted components. However, as shown in FIGURE 1 we prefer to pump the preheated material into a steam-jacketed votator wherein the temperature is rapidly increased to the sterilizing range of from 225° F. to 400° F., preferably 250° to 300° F. The undiluted material is held substantially at this temperature, while flowing, for a period of time sufficient to effect sterilization, which may be as much as about 240 seconds but preferably 70 seconds or less. After a sufficient period for sterilization of the undiluted material, dilution water is added at a constant rate and at a temperature whereby the diluted material will still be at a sterilizing temperature, preferably in the range of 250° to 270° F., whereby the diluted material will be insured sterile. The dilution water is preferably added in an amount slightly in excess of the requirements for the final formula, where deaeration of the mixture is contemplated.

The diluted formula at this point may be placed directly in cans and sealed in accordance with our improved method. However, we prefer to flash-deaerate the hot, diluted formula under superatmospheric conditions regulated to limit temperature drop during the deaeration process to no more than about 20° F. to a final temperature of about 250° F. or more. The deaeration step is controlled to boil off or flash any excess dilution water and has been found to carry away volatiles which evidently have heretofore contributed to a "cooked-in-the-can" flavor. The diluted formula after deaeration is preferably maintained at 250° F. to 270° F. and is placed in clean, unsterilized cans under superatomspheric pressure averaging 15 p.s.i.g. or greater. The canning pressure is maintained at a level which holds the boiling point of the formula above its filling temperature.

The filled cans are then sealed and delivered to atmospheric conditions where they are maintained in a heated environment at a temperature which holds the interior of the can substantially at the filling temperature without adding heat thereto. The sealed cans are maintained at closing temperature for a period of time sufficient to sterilize the inner surface of the container to an $F_0$ value of at least about $F_01$. This period may also be adjusted in accordance with the cooking requirements of the product and may be up to about 10 minutes but is preferably 5 minutes less. Thereafter, the cans are cooled substantially to room temperature and packed. However for other than small size cans it is preferable to maintain the filled and sealed cans at elevated pressure throughout the period they are held at filling temperature and initially cooled. Also for larger cans a longer holding period will be preferred.

The following examples will serve to illustrate the present invention but are not to be considered in any way indicative of the limits of the invention, reference being directed to the claims for that purpose:

EXAMPLE I

A corned beef hash formula was prepared, containing less water than required in the final product, and blended to a temperature of 150° F. The formula comprised about 60.0% double ground beef trimmings, 12.0% dehydrated potatoes, 3.7% combined salt, sugar, and seasoning, and 24.3% water. This formula was pumped into a system similar to that shown in FIGURE 1, but omitting the heat exchanger, wherein injected steam supplied all of the necessary heat. Formula at 150° F. was pumped at 60 lb./min. 90 p.s.i.g., and steam at 332° F. 90 p.s.i.g. was injected at the rate of 7.5 lb./min. The resultant mixture flowed through a holding conduit at the rate of 67.5 lb./min. with a transit time of 46 seconds at 80–90 p.s.i.g. and 276–280° F. Dilution water at 106° F., 120 p.s.i.g. was added to the flow at a rate of 5 lbs./min.; and the resultant mixture at 262° F. was continuously moved from a back pressure pump at the rate of 72.5 lbs./min., 18–20 p.s.i.g. to a deaerator. The deaerator vessel exhausted vapors at about 18–20 p.s.i.g. and 255° F. at the rate of approximately 0.5 lb./min.; and discharged product at 255° F., 18–20 p.s.i.g. for delivery to the pressure chamber at the rate of 72 lbs./min. The completed formula at 255° F. was filled into cleaned, unsterilized cans, sealed and held substantially at filling temperature for about 5 minutes.

EXAMPLE II 75 lbs. per minute of an undiluted beef stew composition consisting of 23.1% cooked, cubed beef, 10.2% beef broth, 40% potatoes, 13.3% carrots, 6% onions, 2% water, and 5.4% combined flour, salt, beef suet and flavoring, which had been blended to 170° F. was pumped to a Votator while injecting 5 lbs. of steam per minute before reaching the Votator. Temperature in the Votator was increased to 300° F., which was held for two seconds, after which 20 lbs. per minute of water at 150° F. was added to bring the beef stew to complete dilution at a temperature of 270° F. The diluted mixture was deaerated, causing the temperature to drop to 255° F., at which temperature it was canned and sealed and held at filling temperature for 5 minutes.

EXAMPLE III 75 lbs. per minute of undiluted beef stew components, prepared as related in Example II, was pumped to a heat exchanger adding 5 lbs. of steam per minute prior to entry thereto. The undiluted mixture was raised to a sterilization temperature of 270° and held at that temperature while flowing through conduit for 70 seconds. Thereafter, 20 lbs. per minute of water superheated to 270° F. was added to give a totally diluted formula at 270° F. The formula was deaerated as in Example I to 255° F. and injected into cans.

EXAMPLE IV 75 lbs. per minute of the undiluted beef stew composition prepared in accordance with Example II was pumped to a heat exchanger, adding 5 lbs. per minute of steam just prior to entering thereto. The mixture was raised to a sterilization temperature of 280° F. which was held while flowing through a conduit for 20 seconds; after which 20 lbs. per minute of water superheated to 230° F. was added, giving a diluted mixture at 270° F. The diluted formula was deaerated to a temperature of 255° F., injected, and sealed in cans.

EXAMPLE V

A spaghetti and meat sauce mixture comprising:

| | Percent |
|---|---|
| Blanched spaghetti | 36.9 |
| Beef | 17.2 |
| Tomato paste | 20.44 |
| Cheddar cheese | 4.0 |
| Onions | 4.0 |
| Sugar | 2.55 |
| Salt | 2.12 |
| Water | 12.0 |
| Seasoning and vinegar | .79 | was prepared and heated to 170° F. 70 lbs. per minute of the concentrated mixture was pumped through a conduit wherein 8 lbs. per minute of steam was added to raise the temperature to about 270° F., which was held for 15 seconds for sterilization. Approximately 22 lbs. per minute of water at 210° F. was added to provide the dilution requirement. This material was not deaerated but dilution lowered the temperature to about 255° F. at which it was injected into cans under pressure, sealed and held in atmospheric air heated to 250° to 300° F. for a period of one minute to sterilize the cans. Cans were subsequently chilled in tap water.

Our method also contemplates the addition of non-pumpable components of product formula to the unsterilized cans under superatmospheric conditions wherein such items are heated to sterilizing temperatures in the range of about 250° F. and placed in the cans apart from the sterilized pumpable components.

EXAMPLE VI

A concentrated spaghetti-meat sauce representing approximately 75% of the final sauce formula, containing approximately the following ingredients:

| | Percent |
|---|---|
| Ground beef | 24.8 |
| Onions | 5.8 |
| Tomato paste | 30.7 |
| Cheddar cheese | 5.8 |
| Water | 26.0 |
| Sugar | 3.68 |
| Salt | 3.07 |
| Seasoning and vinegar | .15 | was prepared by heating to 170° F. The undiluted sauce was pumped to a heat exchanger at the rate of 75 lbs. per minute, adding 5 lbs. per minute of steam just prior thereto. The mixture was heated to 290° F. and held for 5 seconds while flowing in a conduit. 20 lbs. per minute of 190° diluting water was added to form a mixture at 270° F., which was continuously deaerated to a temperature of 260° F., and delivered for injection into cans. Pre-blanched spaghetti was first heated to 250° F. in the can by direct steam injection. 4 oz. spaghetti, 1½ oz. steam as condensate, and 10 oz. meat sauce were placed in each can, which was then sealed and held for 1 minute at 250° F.

EXAMPLE VII

To can beef steaks and gravy, a concentrated gravy formula was prepared at 150° F., including the following ingredients:

| | Percent |
|---|---|
| Water | 62.5 |
| Onions | 19.5 |
| Flour | 10.5 |
| Salt | 3.0 |
| Beef suet | 3.0 |
| Coloring and flavoring | 1.5 |

This concentrated formula was pumped through a conduit at the rate of 30 lbs. per minute, to which 5 lbs. per minute of steam was continuously injected to provide all of the sterilization requirements raising the temperature of the mixture to 295° F. at 55 p.s.i.g. Temperature and pressure were held for 5 seconds, after which 10 lbs. per minute of diluting water at 190° F. was added, giving a diluted formula at 270° F. The diluted gravy was deaerated to a temperature of 260° F. preparatory to injecting into cans. Meanwhile, in the pressure chamber, ¼ inch thick boneless beef roundsteaks were heated under a bank of infrared lamps to a center temperature of about 220° F. preparatory to canning. Surface temperature of the steaks was approximately 255° F. In the pressure chamber 2 oz. of gravy at 260° F., and 4 oz. of the heated steaks were placed in each can which was subsequently sealed and held at atmospheric pressure for 10 minutes in air heated within the range of 250° to 300° F. The cans were subsequently cooled in tap water.

EXAMPLE VIII

Gravy was prepared in the identical manner as recited in Example VII for producing canned beefsteaks and gravy. The steaks, however, were prepared by taking 3-inch diameter molded and quick frozen steaks at −10° F., averaging 2 oz. per steak, and heating in deep fat at 280° F. to an internal temperature of 220° F., 2 oz. of gravy at 260° F. and 4 oz. of steaks were sealed in each can, which was subsequently held for 5 minutes at its internal temperature by exposing to atmospheric pressure air heated to the range of 250° to 300° F. The cans were cooled in tap water.

The method and system of this invention is also useful in preparing pet foods as follows:

EXAMPLE IX

An incompletely diluted dog food formula comprising about 80% of the total formula and containing all of the solid constituents including ground meats, cereals, salt, iron oxide and sodium nitrite was blended at approximately 155° F. The undiluted formula was introduced into the previously described system of this invention and rapidly heated to 310° F. under pressure, at which temperature it was held for 10 seconds. 5 lbs. per minute of steam was injected into 80 lbs. per minute of the undiluted formula just prior to the heat exchanger. After the hold period of 10 seconds, 16 lbs. per minute of dilution water at 100° F. was added to bring the mixture to 101% of its requirements. Temperature of the diluted formula was then 270° F. This mixture was deaerated to 250° F. to flash off the excess water; and was injected into cans and sealed in the pressure chamber. The canning temperature was held for 10 minutes to insure sterilization of the internal wall of the container.

EXAMPLE X

The incompletely diluted dog food formula of the preceding example was pumped at the rate of 80 lbs. per minute to a heat exchanger, adding 5 lbs. per minute of steam. Temperature of the mixture was increased to 270° in the heat exchanger and held for a period of 240 seconds. Super-heated dilution water at 270° F. was added at the rate of 16 lbs. per minute to bring the mixture to 101% of its requirements. The diluted mixture at 270° F. was deaerated to a temperature of 250° F. to flash off the excess liquid. Cans were filled in the pressurized chamber; and held at the internal temperature under atmospheric conditions to insure sterilization of the container walls.

EXAMPLE XI

An incompletely diluted dog food formula was prepared in accordance with Example IX and pumped at the rate of 80 lbs. per minute to the heat exchanger, adding 5 lbs. per minute of steam. Temperature of the mixture was raised to 290° F. in the heat exchanger and held for a period of 35 seconds. Dilution water at 180° F. was added at the rate of 16 lbs. per minute, resulting in a mixture at 270° F. and representing 101% of the formula requirements. The diluted mixture was deaerated and canned at 250° F. The cans were subsequently held at internal temperature under atmospheric conditions for a short period insuring sterilization of the internal walls, and subsequently cooled.

Additional examples of human food items produced at higher rates and for filling large size cans which are held at filling temperature in an elevated pressure atmosphere follow:

EXAMPLE XII

A chili with beans formula was prepared for subsequent heat sterilizing and dilution solely by steam injection. The formula comprised 27.2% double ground beef, 26.9% blanched No. 1 red beans (soaked and blanched to approximately 245% yield), 8.7% tomato paste, 8.5% spice (combined, salt, sugar, cornstarch and other selected spices), and 28.7% water. This formula was mixed and brought to a temperature of about 175° and transferred to a continuous stuffer pump from which it was forced at a rate of 165 lbs. per minute into a system similar to that shown in FIGURE 1 but omitting a heat exchanger and dilution equipment. Steam was injected at a rate of 14 lbs. per minute to raise the temperature immediately to 270° F. and fully dilute the formula by condensation. The heated formula was flowed through about 46 feet of conduit, retention time about 60 seconds, and delivered at about 265° F. to a deaerator vessel located within the pressure chamber. Pressure was dropped to reduce the formula temperature to 255° F.; and the formula was pumped directly to a filler and filled into number 10 cans at about 252° F. (603×700—approximately 6 lb. 10 oz. per can) which were immediately sealed and washed with water at 250° F.—all within a chamber at about 18 p.s.i.g. Thereafter, while retained at elevated pressure within the chamber, the cans were held approximately at filling temperature for eight minutes (temperature of product actually adjusting to 245° F.) then briefly cooled to condense head-space vapors and discharged from the chamber whereupon the cans were immediately further cooled, at atmospheric pressure, until product temperature declined below 110°F.

EXAMPLE XIII

A chicken stew formula was prepared for subsequent heat sterilizing and partial diultion solely by steam injection. The formula comprised 18.6% diced chicken meat, 22.5% diced potatoes, 12.1% frozen carrots, 6.1% frozen baby lima beans, 2.5% wheat flour, 1.8% corn oil, 1.5% chicken fat, 8.9% chicken broth (15% solids), 4.5% selected spices, and 21.6% water. This formula was mixed and brought to a temperature of about 175° F. and transferred to a continuous stuffer pump from which it was fed at a rate of 136 lbs. per minute into a system according to Example XII. Steam was injected at a rate of 13 lbs. per minute to raise the liquid formula temperature to 270°F. and partially dilute the formula by condensation. The heated formula was flowed through about 52 feet of conduit, retention time about 90 seconds, and delivered at about 265° F. to a deaerator vessel located within the pressure chamber. Following deaeration the formula temperature dropped to about 255° F. and the formula was pumped through a pipe to a filler. Additional dilution water at 250-255° F. was continuously metered into the pipe and formula at a rate of 13 lbs. per minute. Thereafter the fully diluted formula was delivered into No. 10 cans at about 252° F. The cans were immediately sealed and washed with water at 250° F. within the chamber at 18 p.s.i.g., and thereafter held for eight minutes substantially at filling temperature (product temperature adjusting to 245° F.). The cans were briefly cooled and then ported to atmosphere whereupon they were immediately further cooled to below 110° F.

Obviously, many modifications and variations of the invention as hereinbefore set forth may be made without departing from the spirit and scope thereof, and therefore only such limitations should be imposed as are indicated in the appended claims.

We claim:

1. An improved method for sterilizing and subsequently canning food material wherein the sterilizing and canning steps are performed under superatmospheric conditions, said method comprising: preparing a food material formula to be sterlized containing substantially less liquid than required in the final product to the canned; injecting steam into said formula and thereby rapidly increasing the temperature of said formula to a sterilizing level in the range of about 225° F. to about 400° F. while maintaining a superatmospheric pressure thereon sufficient to prevent boiling of said formula, said steam subsequently condensing and diluting said concentrated formula; maintaining the temperature and pressure upon said formula at said sterilizing level for a period of up to 240 seconds to insure adequate sterilization thereof; flash-deaerating the formula to a reduced superatmospheric pressure inducing a temperature drop of no more than about 20° F. to remove volatile substances therefrom, and to reduce the temperature toward a filling temperature; subsequently filling the diluted food material into containers at said filling temperature and at a superatmospheric pressure; and finally holding said filled containers at about said filling temperature for a period of 1-10 minutes.

2. An improved method for sterilizing and subsequently canning food material wherein the sterilizing and canning steps are performed under superatmospheric conditions, said method comprising: preparing a food material formula to be sterilized containing substantially less liquid than required in the final product to be canned; rapidly increasing the temperature of said formula to a sterilizing level in the range of about 225° F. to about 400° F. while maintaining a superatmospheric pressure thereon sufficient to prevent boiling of said formula; maintaining the temperature and pressure upon said formula at said sterilizing level for a period of up to about 240 seconds to insure adequate sterilization thereof; flash-deaerating the formula to a reduced superatmospheric pressure inducing a temperature drop of no more than about 20° F. to remove volatile substances therefrom, and to reduce the temperature toward a filling temperature; injecting additional liquid into said formula after said period in an amount to complete at least the total liquid required by the final product; filling the diluted food material into containers at said filling temperature and at a superatmospheric pressure; and finally holding said filled containers at about said filling temperature for a period of 1-10 minutes.

3. The method according to claim 1 wherein the food material formula is sterilized at a temperature within the range of 250° F.-300° F. and the food material is subsequently filled into containers at a temperature within the range of 250° F.-270° F.

4. The method according to claim 2 wherein the food material formula is sterilized at a temperature within the range of 250° F.-300° F. and the food material is subsequently filled into containers at a temperature within the range of 250° F.-270° F.

5. The method according to claim 2 wherein the food material formula initially constitutes about 75%-80% of said final product, being of a lesser liquid content, and the additional liquid required is injected into said food material before being filled into containers.

6. The method according to claim 4 wherein the food material formula initially constitutes about 75%-80% of said final product, being of a lesser liquid content, and the additional liquid required is injected into said food material before being filled into containers.

7. The method of claim 5 wherein the additional liquid is injected at a temperature below said sterilizing temperature and below the temperature of said food material at the point of liquid injection whereby to also decrease the temperature of the food material toward said filling temperature.

8. The method of claim 2 wherein an additional food component of nonflowable nature is processed under superatmospheric conditions and heated to an internal temperature of about 220° F. and an external temperature of at least about 250° F., and said nonflowable component is placed in said containers with a quantity of said diluted food material.

References Cited by the Examiner

UNITED STATES PATENTS

| | | | |
|---|---|---|---|
| 2,286,999 | 6/1942 | Smith | 99—182 |
| 2,541,113 | 2/1951 | Smith et al. | 99—184 |
| 2,575,863 | 11/1951 | Clifcorn | 99—182 |
| 2,639,991 | 5/1953 | Ball | 99—182 |
| 2,862,821 | 12/1958 | Wilbur et al. | 99—182 |
| 3,041,185 | 6/1962 | Martin | 99—182 |

A. LOUIS MONACELL, *Primary Examiner.*